US006969054B2

(12) United States Patent
Sueme et al.

(10) Patent No.: US 6,969,054 B2
(45) Date of Patent: Nov. 29, 2005

(54) RECEIVING STAND FOR FRAME STACKING SYSTEM

(75) Inventors: Richard J. Sueme, O'Fallon, MO (US); Terry L. Daniel, St. Ann, MO (US); Kathy Liuhui Jin, Chesterfield, MO (US)

(73) Assignee: Mitek Holdings, Inc., Wilmington, DE (US)

( * ) Notice: Subject to any disclaimer, the term of this patent is extended or adjusted under 35 U.S.C. 154(b) by 520 days.

(21) Appl. No.: 10/008,514

(22) Filed: Nov. 8, 2001

(65) Prior Publication Data

US 2003/0085501 A1   May 8, 2003

(51) Int. Cl.[7] ............................................. B65G 57/00
(52) U.S. Cl. ........................... 269/37; 269/13; 269/910
(58) Field of Search ........................... 269/13, 14, 303, 269/304, 306, 315, 157, 254 CS, 37, 910; 29/281.3

(56) References Cited

U.S. PATENT DOCUMENTS

| | | | | |
|---|---|---|---|---|
| 1,245,638 | A | * | 11/1917 | Trcka ........................... 269/303 |
| 2,053,699 | A | * | 9/1936 | Coates ................. 269/254 CS |
| 3,984,010 | A | | 10/1976 | Woloveke et al. |
| 4,439,098 | A | | 3/1984 | Rienks |
| 5,468,118 | A | | 11/1995 | LePoire |

* cited by examiner

Primary Examiner—Robert C. Watson
(74) Attorney, Agent, or Firm—Senniger Powers

(57) ABSTRACT

A receiving stand for a frame stacking system of the type used to stack prefabricated frames has a bench configured for receiving and supporting the frames thereon. A stanchion is pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench. A spring member biases the stanchion toward its upright position.

12 Claims, 6 Drawing Sheets

RECEIVING STAND FOR FRAME STACKING SYSTEM

BACKGROUND OF THE INVENTION

This invention generally relates to frame stacking systems for stacking large, assembled frames such as trusses for subsequent bundling and transport, and more particularly to a receiving stand for such frame stacking systems.

Prefabricated frames such as those used in housing construction are fabricated in various shapes and sizes. For example, a typical roof truss comprises truss components including a lower chord, angularly arranged upper chords and web members extending between and connecting the upper and lower chords. These trusses are generally fabricated at an assembly station in a horizontal orientation, such as by laying out the truss components on an assembly table and then connecting the elements to form the truss. Successive, similarly sized trusses are conveyed from the assembly station to a stacking station where the trusses are aligned and stacked together by a stacking system for subsequent bundling and transport to a construction site.

Some currently available stacking systems are configured for stacking prefabricated frames in a generally upright orientation. This stacking scheme has proven particularly useful in "peak-up stacking" of frames such as roof trusses wherein the trusses are stacked side-by-side in an upright orientation, with the peaks of the trusses pointed generally upward. For example, one such stacking system is offered by MiTek Industries, Inc. of St. Louis, Mo. under the tradename PEAK-UP STACKER. This stacking system comprises individual receiving stands spaced laterally from each other with their front ends positioned adjacent to a powered conveyor. Trusses are delivered by the conveyor to the stacking station in a generally horizontal orientation and then raised off of the conveyor by a lifting assembly to an upright orientation. Each receiving stand of the stacking system comprises a bench on which trusses are received in their upright orientation, and a stanchion extending up from the bench for supporting the trusses on the bench in their upright orientation. When a desired number of trusses has been stacked on the receiving stands, the trusses are banded together to form a truss bundle and the bundle is lifted up off of the bench by a fork-lift or other suitable lifting apparatus. Each stanchion is then manually pivoted relative to the respective bench to a lowered position away from the truss bundle to permit the truss bundle to be carried rearward away from the receiving stands by the fork-lift.

While such a stacking system has proven effective for stacking trusses in an upright orientation, repeated manual movement of the stanchions between their raised and lowered positions is often cumbersome and fatiguing for operators. The stanchions are about 14 feet in length and weigh more than 100 pounds apiece. Consequently, a substantial physical effort is required to lower each stanchion from its raised position to its lowered position in a controlled manner, and to subsequently lift the stanchion back up to its raised position for stacking another set of trusses on the receiving stands.

To this end, it is known to provide a counterweight at the lower end of the stanchion to gravitationally bias the stanchion toward its upright position. Thus, less effort is required by the operator to raise and lower the stanchion. However, because of the length of the stanchion, the counterweight be of substantial weight, such as more than 200 lbs. Adding such a large block of weight to the lower end of the stanchion renders the receiving stand bulky, extraordinarily heavy and difficult to manufacture.

SUMMARY OF THE INVENTION

Among the several objects and features of the present invention is the provision of a receiving stand for a frame stacking system; the provision of such a receiving stand for stacking frames in a generally upright orientation; the provision of such a receiving stand that facilitates bundling and transport of the frames from the stand after the frames are stacked thereon; and the provision of such a receiving stand which is less strenuous to operate.

In general, a receiving stand of the present invention for a frame stacking system of the type used to stack prefabricated frames comprises a bench configured for receiving and supporting the frames thereon. A stanchion is pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench. A spring member biases the stanchion toward its upright position.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
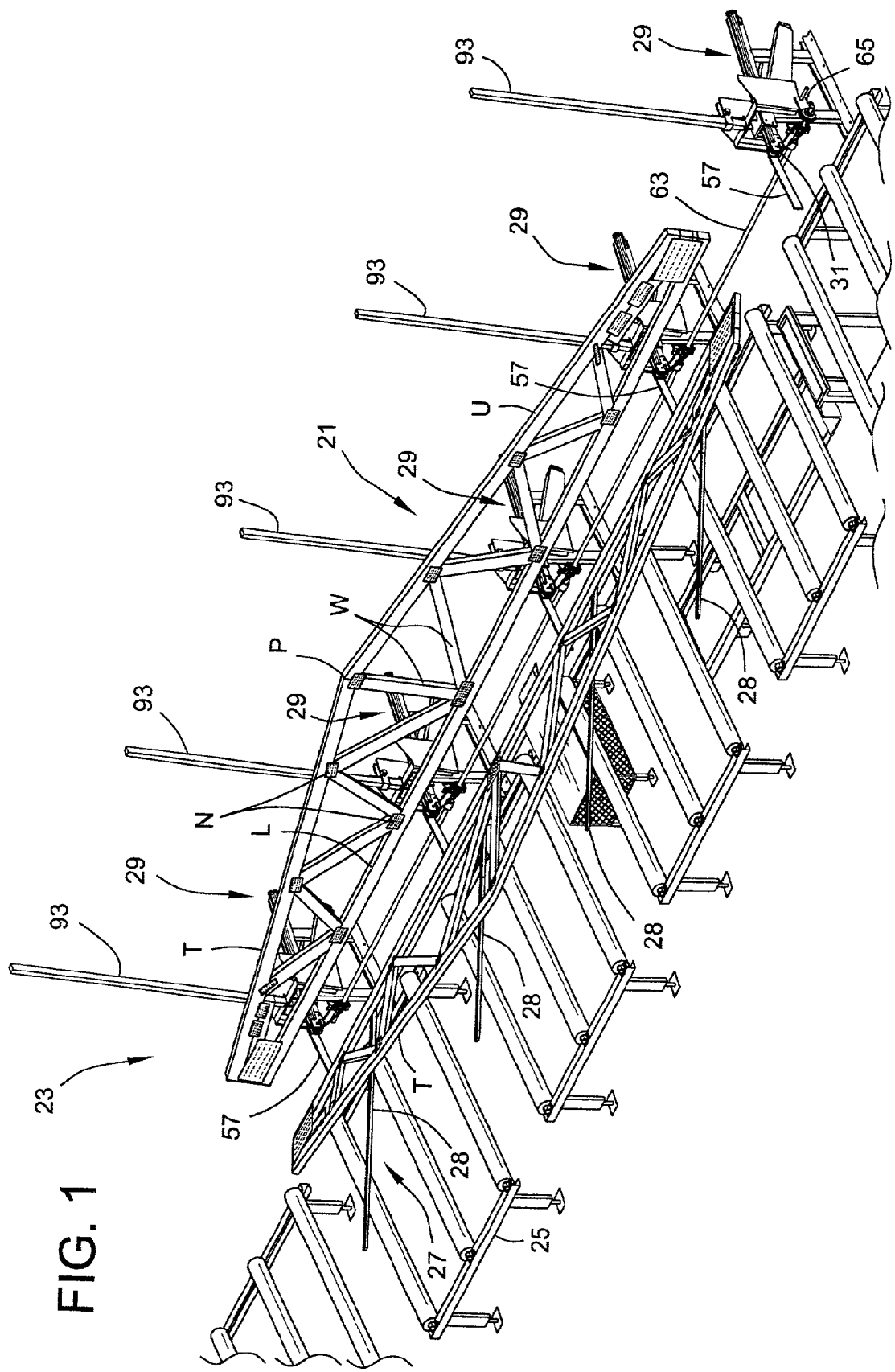
FIG. 1 is a fragmentary perspective of a stacking system in which prefabricated frames are stacked on receiving stands of the present invention.

Now referring to the drawings, and in particular to FIG. 1, a stacking system for stacking prefabricated frames used in housing or building construction, such as roof trusses T, or wall frames, floor trusses and the like, is indicated in its entirety by reference numeral 21. The stacking system 21 is shown and described herein as part of a truss stacking station, generally indicated at 23, for stacking prefabricated trusses T assembled at an assembly station (not shown). The trusses T of FIG. 1 are conventional roof trusses comprising truss components including a lower chord L, angularly arranged upper chords U and web members W extending between and connecting the upper and lower chords. The trusses T are assembled at the assembly station in a horizontal orientation, such as by laying out the truss components on an assembly table (not shown) and then connecting the elements together (as by nailing plates N) to form a truss. Trusses T are then delivered by a conveyor 25 from the assembly station to the stacking station 23 in a generally horizontal orientation.

The conveyor 25 of the illustrated embodiment is a powered conveyor and includes a powered lift assembly, generally indicated at 27, capable of raising trusses T delivered to the stacking station 23 by the conveyor to an upright orientation with a peak P of each truss pointing generally upward. One preferred such conveyor 25 and lift assembly 27 is available from MiTek Industries, Inc. of St. Louis, Mo. under the tradename PEAK-UP STACKER. As trusses T are delivered by the conveyor 25 to the stacking station 23 in a horizontal orientation, lifting arms 28 of the lift assembly 27 are pivoted up from below the conveyor to lift the truss off of the conveyor as shown in FIG. 1 and to pivot the truss up to an upright orientation. Construction and operation of the truss assembly station to fabricate the truss T, as well as construction and operation of the conveyor 25 and lift assembly 27, is well known in the art and will therefore not be further described herein except to the extent necessary to set forth the present invention. Also, it is understood that stacking system 21 may be used for stacking prefabricated frames other than trusses T, and that prefabricated frames may be stacked by the stacking system 21 in a horizontal orientation instead of an upright orientation, without departing from the scope of this invention.

Receiving stands, generally indicated at 29, for receiving trusses T raised off of the conveyor 25 by the lift assembly 27 are positioned along the side of the conveyor in generally parallel, spaced relation with each other so that a front end 31 of each receiving stand is disposed adjacent the conveyor. The stacking system 21 of the illustrated embodiment includes five receiving stands 29 spaced approximately 12 ft. apart for stacking trusses T having a length in the range of about 16 ft. to 60 ft. and a height of up to about 14 ft. However, it is understood that the stacking system 21 may include more or less than five receiving stands 29, depending on the length of trusses T to be stacked on the receiving stands.

Figure 2:
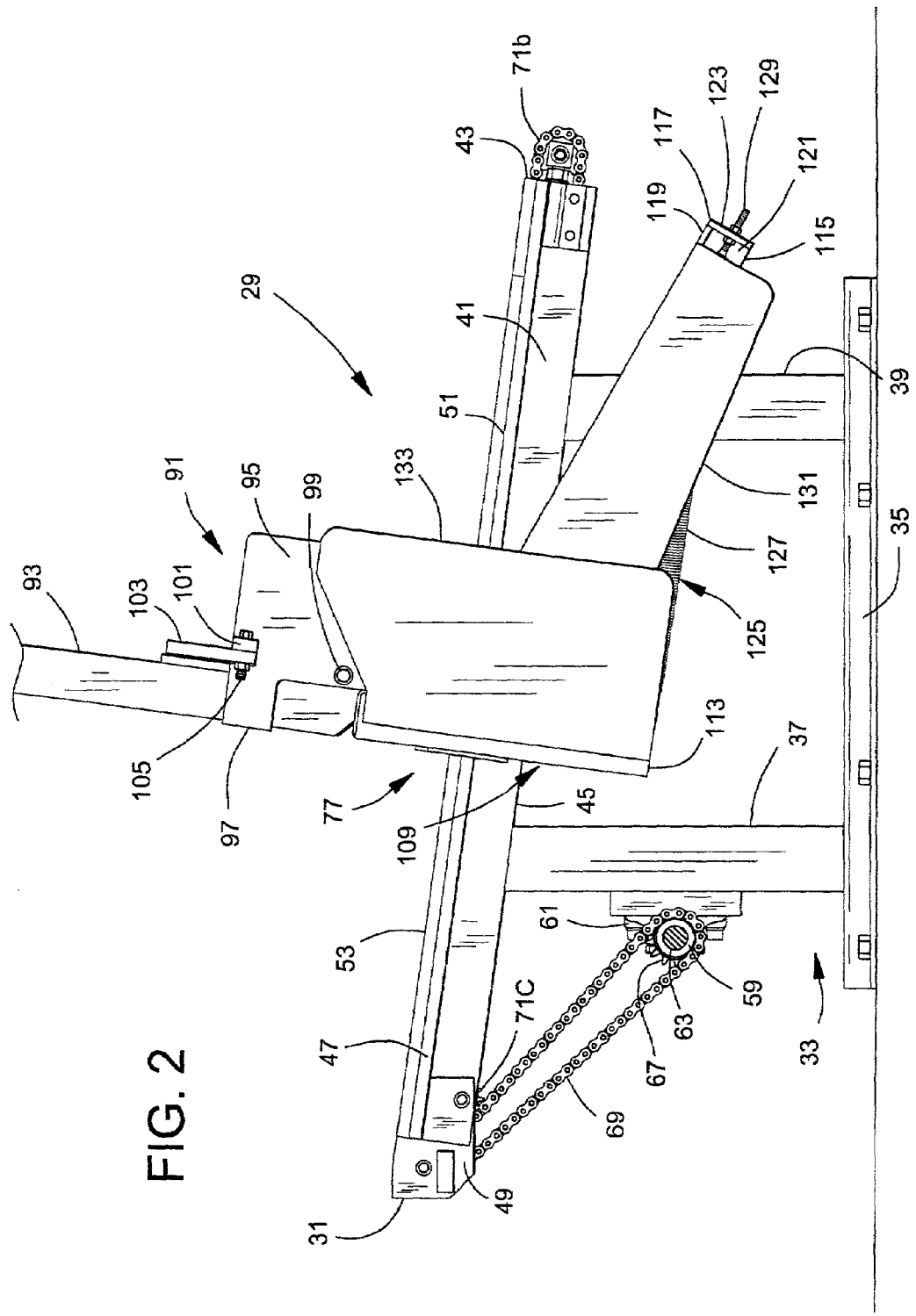
FIG. 2 is a fragmentary side view of one of the receiving stands of FIG. 1 with a stanchion of the receiving stand shown in a raised, upright position.
Figure 4:
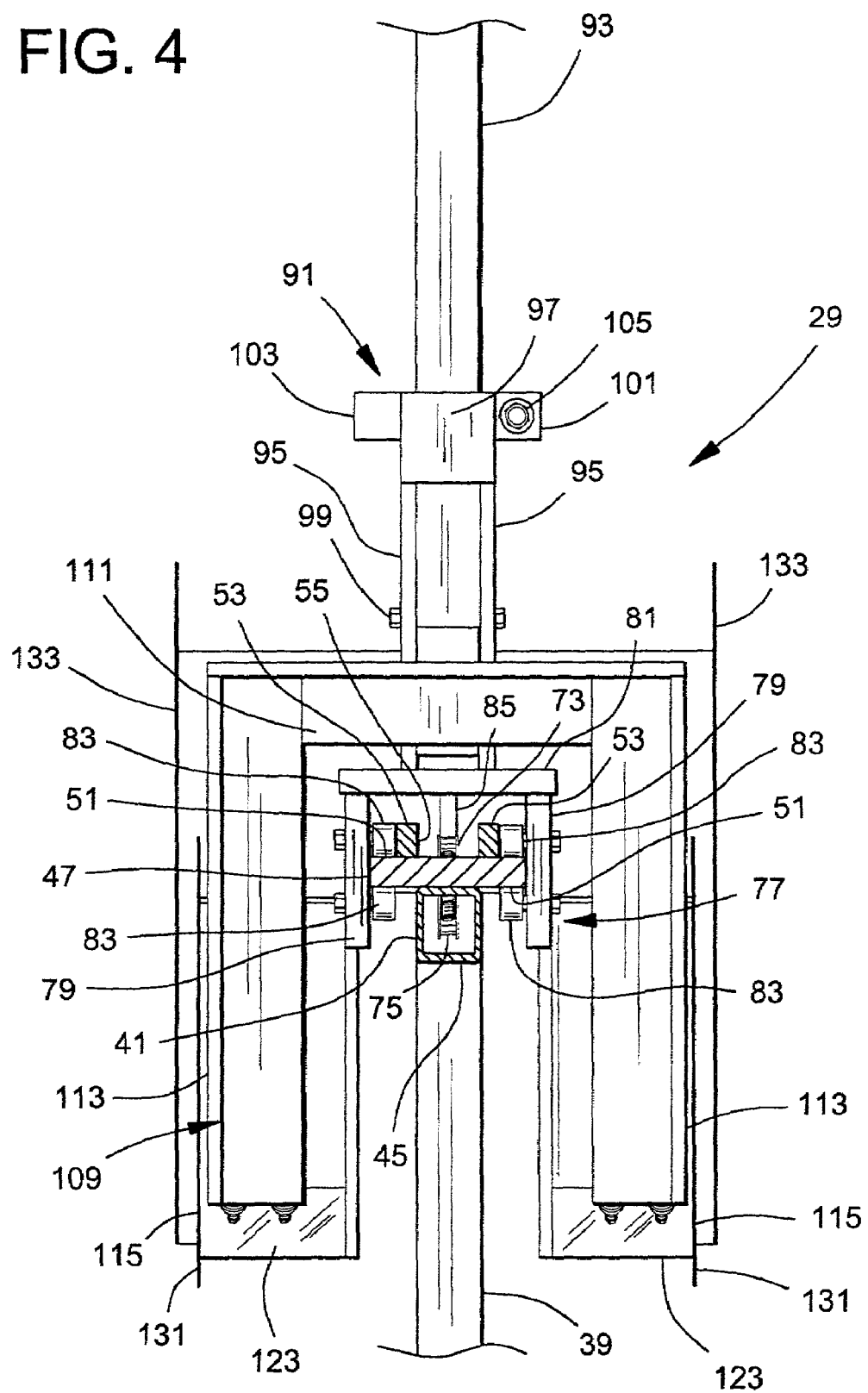
FIG. 4 is a section taken in the plane of line 4—4 of FIG. 3.
Figure 5:
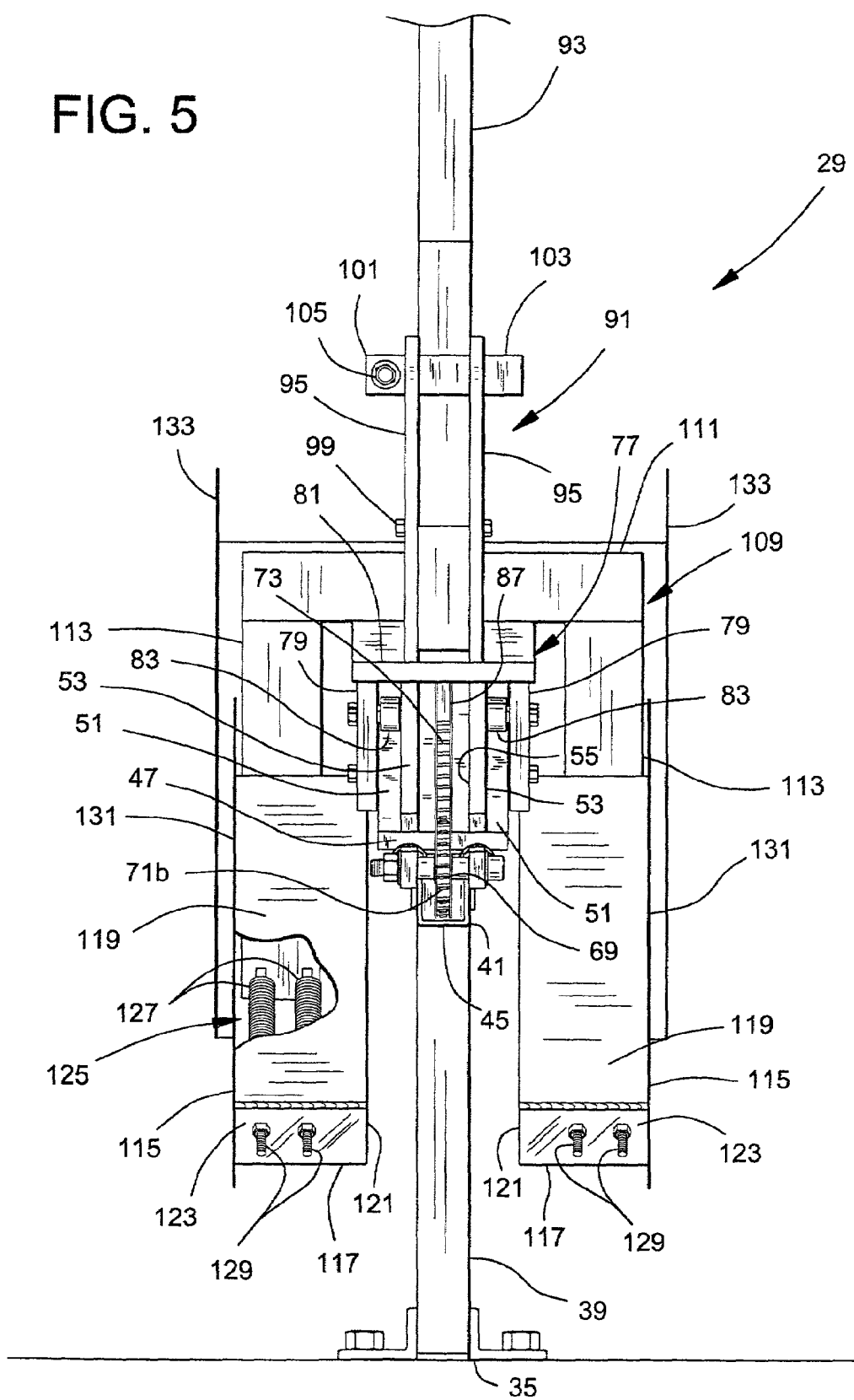
FIG. 5 is a fragmentary rear view of the receiving stand of FIG. 2.

With particular reference to FIG. 2, each receiving stand 29 comprises a bench, generally indicated at 33, having a base 35 configured for supporting the receiving stand on a level surface such as a floor or the ground. A pair of support legs 37, 39 are secured to the base 35, such as by being welded thereto, and extend up from the base to support an elongate rail member 41 on which trusses T are received and supported during stacking. In the illustrated embodiment, the forward support leg 37 is taller than the rear support leg 39 so that the rail member 41 is supported at an angle relative to the ground, with the rail member sloping downward from the front end 31 to a rear end 43 of the receiving stand 29. As shown in FIGS. 4 and 5, the rail member 41 is constructed of an elongate, generally rectangular tube 45 and an elongate beam 47 secured to the top of the tube, such as by being welded thereto. The rear of the beam 47 of the illustrated embodiment is coextensive with the rear of the tube 45 to define the rear end 43 of the receiving stand 29 and the front of the beam extends longitudinally forward beyond the front of the tube. A bracket assembly 49 is connected to the front of the beam 47 to define the front end 31 of the receiving stand 29.

The beam 47 is also wider than the tube 45 to extend laterally outward beyond the sides of the tube for defining laterally opposite guide rails 51, the purpose of which will become apparent. A pair of ribs 53 are secured to the top of the beam 47, such as by being welded thereto, in parallel, laterally spaced relation with each other laterally inward of the guide rails 51 and extend longitudinally substantially the length of the beam. The ribs 53 and the beam 47 therefore together define an open channel 55 extending substantially the length of the rail member 41, with the ribs defining the uppermost surface of the rail member upon which trusses T are received and supported during stacking. A bridging member 57 (FIG. 1) is fastened to and supported by the bracket assembly 49 to extend forward from the front end 31 of the receiving stand 29 for bridging any gap between the front end of the stand and the conveyor 25 to thereby prevent trusses T raised by the lift assembly 27 to an upright orientation from falling down between the stand and the conveyor.

Figure 3:
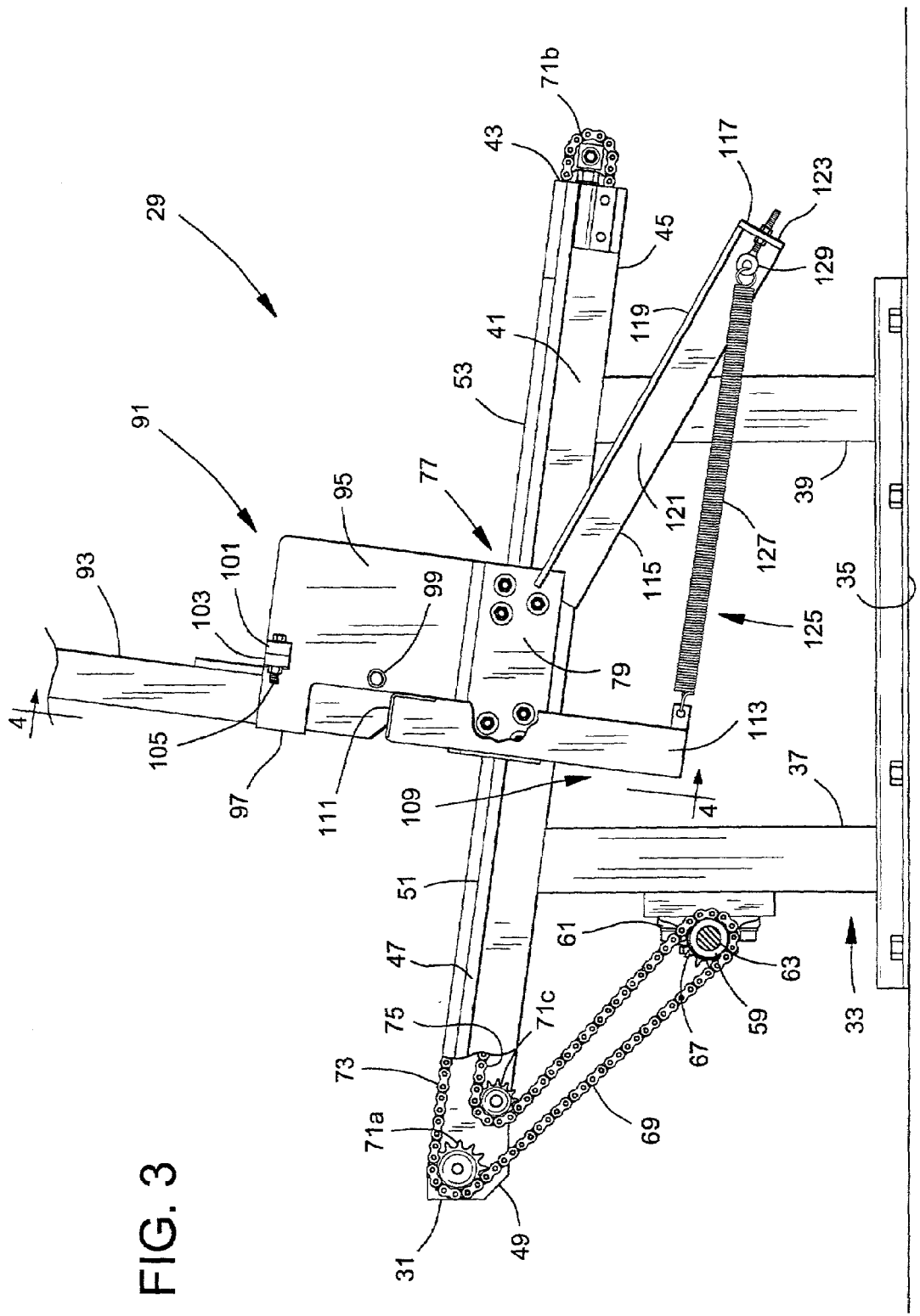
FIG. 3 is the fragmentary side view of FIG. 2 with shield panels of the receiving stand removed and other portions of the receiving stand broken away to reveal additional construction thereof.

A tubular bushing 59 is mounted on the forward support leg 37 of each receiving stand 29 below the rail member 41 by a suitable bracket 61 and is oriented generally transverse to the rail member and the support leg. As shown in FIG. 1, a shaft 63 extends through and is supported by the tubular bushings 59 of the receiving stands 29 and is rotatable within the bushings about a rotation axis of the shaft via a crank handle 65 secured to one end of the shaft. With reference to FIG. 3, a drive sprocket 67 is secured to the shaft 63 adjacent the bushing 59 of each receiving stand 29 for conjoint rotation therewith about the rotation axis of the shaft to drive movement of a chain 69 of each receiving stand upon rotation of the shaft. Three idler sprockets 71a, 71b, 71c are rotatably mounted on each receiving stand 29 for supporting the chain 69. More particularly, one idler sprocket 71a is mounted on the bracket assembly 49 at the front end 31 of the receiving stand 29, another idler sprocket 71b is mounted on the beam 47 at the rear end 43 of the stand, and the third idler sprocket 71c is mounted on the bracket assembly slightly rearward and below the idler sprocket 71a at the front end of the stand. The chain 69 extends forward and up from the drive sprocket 67 to the idler sprocket 71a at the front end 31 of the receiving stand 29, then rearward within the open channel 55 of the rail member 41 to the idler sprocket 71b at the rear end 43 of the stand to define an upper reach 73 of the chain, then forward through the rectangular tube 45 of the rail member to the remaining idler sprocket 71c to define a lower reach 75 of the chain, and back down to the drive sprocket. Thus it will be seen that counter-clockwise rotation of the shaft 63 about its rotation axis effects forward movement of the upper reach 73 of the chain 69 within the open channel 55 of the rail member 41.

A carriage, generally indicated at 77, is mounted on the guide rails 51 of each receiving stand 29 for sliding longitudinal movement on the rail member 41. The carriage 77 comprises laterally spaced side panels 79 and a top panel 81 extending therebetween and connecting the side panels. Cam followers 83 are fastened to the inner face of each side panel 79 by suitable fasteners, with at least two cam followers on each side panel being spaced vertically from each other a distance generally corresponding to the thickness of the guide rails 51 (i.e., the thickness of the beam 47) of the rail member 41. The guide rails 51 are thus received between the vertically spaced cam followers 83 on each side panel 79 to mount the carriage 77 on the guide rails 51 for sliding longitudinal movement on the rail member 41 with the top panel 81 of the carriage extending laterally over the open channel 55 of the rail member. A pair of tabs (i.e., a forward tab 85 and a rear tab 87) depend from the bottom surface of the top panel 81 of the carriage 77 down into the open channel 55 of the rail member 41 in longitudinally spaced relation with each other. The chain 69 is connected at one end to the forward tab 85 and at its opposite end to the rear tab 87 to drivingly connect the carriage 77 with the upper reach 73 of the chain.

The carriage 77 further comprises a stanchion assembly, generally indicated at 91, for supporting a stanchion 93 of the receiving stand 29. The stanchion assembly 91 comprises a pair of side plates 95 secured to the upper surface of the top panel 81 of the carriage 77, such as by being welded thereto, in parallel, laterally spaced relation with each other and extending up from the top panel of the carriage. A generally U-shaped bracket 97 is formed integrally with the front edges of the side plates 95 in flush alignment with the upper edges of the side plates for positioning the stanchion 93 in a raised, upright position (FIGS. 1 and 2) as will be described. The stanchion 93 is disposed intermediate the side plates 95 and a pivot pin 99 extends transversely through the side plates and the stanchion to pivotally connect the stanchion with the carriage 77. The pivot pin 99 thus defines a pivot axis about which the stanchion 93 is pivotable relative to the carriage 77 and the bench rail member 41 the raised, upright position in which the stanchion extends generally up from the carriage and a lowered position (FIG. 6) in which the stanchion extends generally rearward from the carriage beyond the rear end 43 of the receiving stand 29.

Figure 6:
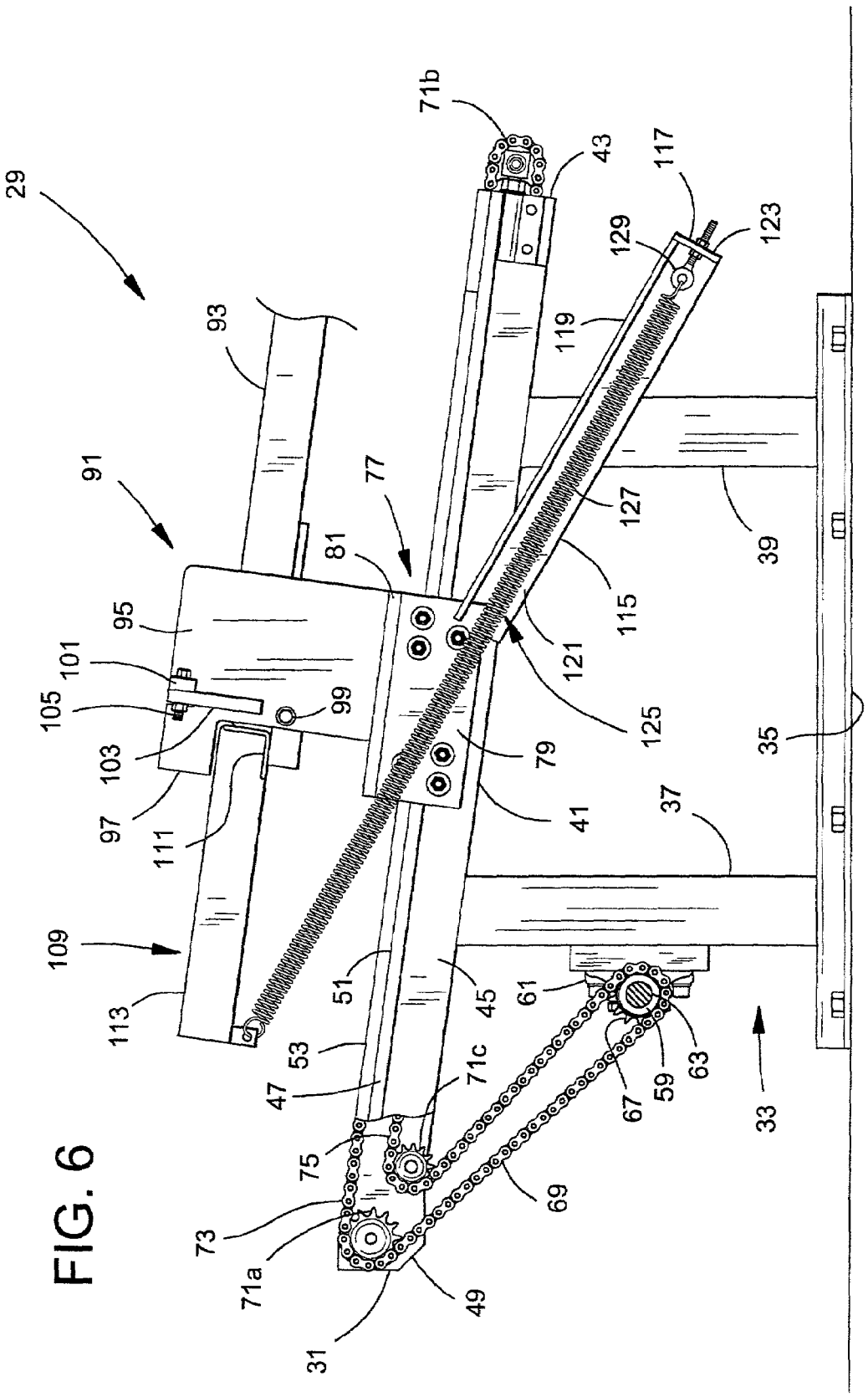
FIG. 6 is a fragmentary side view similar to that of FIG. 3 with the stanchion shown in a lowered position.

A latch mount 101 is secured to one of the side plates 95 adjacent its upper edge and extends laterally outward therefrom. A latch 103 is pivotally connected to the latch mount 101 by a suitable fastener to permit pivoting movement of the latch relative to the side plates 95 between a latched position (FIG. 5) in which the latch extends laterally between the plates and seats within opposed slots (not shown) formed in the upper edges of the plates, and an unlatched position (FIG. 6). In its latched position, the latch 103 holds the stanchion 93 in its upright position against pivoting movement relative to the carriage 77 to the lowered position of the stanchion.

With particular reference to FIG. 4 in which the stanchion 93 is illustrated in its raised, upright position, the portion of the stanchion extending above the pivot pin 99 is constructed of an elongate steel tube having a length of about 14 ft. A U-shaped frame 109 forms the lower end of the stanchion 93 below the pivot pin 99. The frame 109 comprises a cross-member 111 having a generally L-shaped cross-section and being secured to the stanchion 93, such as by being welded thereto. The cross-member 111 of the illustrated embodiment is sized in length to extend transversely outward of the carriage 77 and the rail member 41. Side members 113, also generally L-shaped in cross-section, are secured to the opposite ends of the cross-member 111 and are sized in length to extend down from the cross-member below the rail member 41.

Thus it will be seen that as the stanchion 93 pivots from its upright position (FIG. 2) toward its lowered position (FIG. 6), the portion of the stanchion extending up from the pivot pin 99 rotates rearward and down relative to the carriage 77 and rail member 41 and the frame 109 forming the lower end of the stanchion rotates up and forward. It is contemplated that the cross-member 111 may instead be located above the pivot pin 99 in the upright position of the stanchion 93, as long as the side members 113 of the frame 109 extend down below the pivot pin so that the side members rotate up and forward relative to the carriage 77 and the rail member 41 as the stanchion is pivoted from its upright position toward its lowered position. It is also understood that the stanchion 93 may alternatively be pivotally connected to bench 33 of the receiving stand, or to the carriage 77, at a position laterally offset from the rail member 41. For example, the stanchion 93 may be a constructed of a single elongate tube (not shown) and be pivotally connected with the carriage by the pivot pin 99 at a position laterally outward of the rail member 41 so that the stanchion extends down below the pivot pin 99 and the rail member without the need for the U-shaped frame 109 at the lower end of the stanchion.

With reference to FIG. 2, a pair of elongate mounting brackets 115 are secured to the side panels 79 of the carriage 77, such as by being welded thereto, for conjoint movement with the carriage relative to the rail member 41. The mounting brackets 115 extend generally rearward and down from the carriage 77 in parallel, laterally spaced relation with each other to outer ends 117 of the brackets spaced above the base 35 of the bench 33. Each mounting bracket 115 is generally L-shaped in cross-section and is oriented so that tops 119 of the brackets face up and inner sides 121 of the brackets face in toward each other. The lateral spacing between the mounting brackets 115 corresponds generally to the lateral spacing between the side members 113 of the frame 109 forming the lower end of the stanchion 93. An end plate 123 is secured to the outer end 117 of each mounting bracket 115 distal from the carriage 77.

With reference to FIG. 3, a spring member, generally indicated at 125, is connected to the stanchion 93 of each receiving stand 29 for biasing the stanchion toward its raised, upright position. The spring member 125 of the illustrated embodiment comprises four linear tension springs 127 (two of which are shown in FIG. 4), with two of the springs extending between the end plate 123 of each mounting bracket 115 and the corresponding side member 113 of the frame 109 at the lower end of the stanchion 93. Each spring 127 is connected at one end to the respective side member 113 of the frame 109 below the pivot pin 99. The other end of each spring 127 is connected to a respective eye-bolt 129 threadably received through the end plate 123 of the respective mounting bracket 115 such that threaded movement of the eye-bolt relative to the end plate adjusts the tensioning of the springs. The springs 127 of the illustrated embodiment are sized in length so that in the raised, upright position of the stanchion 93 the springs are substantially unextended (e.g., untensioned).

As an example, the springs 127 of the illustrated embodiment are 21 inches long and have a wire diameter of about 0.148 inches and an outer coil diameter of about 1.25 inches. However it is understood that the springs 127 may be elongated in the raised, upright position of the stanchion 93 to generate a pre-tensile force in the springs. It is also understood that the spring member 125 may comprise more or less than four springs 127, including a single spring, without departing from the scope of this invention.

A shield panel 131 (FIG. 2) is secured to the top 119 of each mounting bracket 115 along substantially the length of the mounting bracket to generally enclose the springs 127 within the tops of the mounting brackets, the inner sides 121 of the mounting brackets and the shield panel. Another shield panel 133 is secured to each side member 113 of the frame 109 forming the lower end of the stanchion 93 for conjoint pivoting movement with the side member upon pivoting movement of the stanchion about the pivot pin 99. The shield panels 133 are sized and oriented so that in the lowered position of the stanchion these shield panels further cover the springs upon elongation thereof. Thus it will be seen that in the lowered position of the stanchion 93, the shield panels 131, 133 together cover the springs 127 to reduce the risk of injury in the event one of the springs fails or breaks loose.

In operation of the stacking system 21, the stanchion 93 of each receiving stand 29 is positioned in its raised, upright position (FIG. 2) with the latch 103 of the stanchion assembly 91 in the latched position. If the carriages 77 of the receiving stands 29 are not already positioned generally toward the front end 31 of the receiving stands, the handle 65 connected to the shaft 63 is manually rotated counter-clockwise to drive forward movement of the upper reach 73 of the chain 69 within the open channel 55 of each stand relative to the rail members 41 of the stands. The forward movement of the upper reach 73 of the chain 69 of each stand 29 slides the carriages 77 forward on the guide rails 51 of the rail members 41 toward the front ends 31 of the receiving stands. As each truss T is delivered to the stacking station 23 by the conveyor 25, the lift assembly 27 pivots the truss up and rearward off of the conveyor toward the receiving stands 29 and orients the truss upright on the rail members 41 of the receiving stands, with the stanchions 93 supporting the truss in an upright orientation. As additional trusses T are stacked on the receiving stands 29, the lift assembly 27, along with the weight of the truss and the stanchions 93, causes the carriages 77 to index rearward on the guide rails 51 to permit another truss to be stacked on the receiving stands.

Once a desired number of trusses T are stacked on the receiving stands 29, the trusses are bundled together in a conventional manner and raised up off of the rail members 41, such as by a fork-lift capable of forward and rearward movement between adjacent receiving stands. The latches 103 of the stanchion assemblies 91 are moved to their unlatched positions and the stanchions 93 are manually pivoted to their lowered position away from the rearward most truss T stacked on the receiving stands 29 (e.g., the first truss that was stacked on the receiving stands). As the stanchion 93 pivots about the pivot pin 99 toward its lowered position, the frame 109 defining the lower end of the stanchion pivots forward and up relative to the carriage 77 and rail member 41. Movement of the frame 109 in this manner elongates the springs 127, thereby creating a tensile force in the springs that pulls rearward on the frame to bias the stanchion 93 toward its upright position. The lifting force required by an operator to support the stanchion 93 and controllably lower it to the lowered position is therefore reduced by the biasing force of the springs 127. With the stanchions 93 lowered, the bundled trusses T can be carried rearward away from the receiving stands 29 by the fork-lift.

Once the truss bundle is removed, the stanchions 93 are manually pivoted by the operator up toward their raised, upright position. The biasing force generated by the elongated springs 127 biases the stanchion 93 toward its upright position, thereby assisting the operator in raising the stanchion. The operator continues to raise the stanchion 93 until the it abuts against the U-shaped bracket 97 of the stanchion assembly 91. While holding the stanchion 93 in this position, the operator moves the latch 103 of the stanchion assembly 91 to its latched position to secure the stanchion 93 in its raised, upright position. The handle 65 is then turned counter-clockwise to rotate the shaft 63 and drive the carriages 77 forward on the guide rails 51 back toward the front ends 31 of the receiving stands 29 for stacking the next set of trusses T.

While the receiving stand of the present invention is shown and described herein as having a spring member 125 comprising linear tension springs 127, it is contemplated that a spring member other than linear tension springs may be used without departing from the scope of this invention. For example, a torsion spring (not shown) acting on the stanchion 93 concentrically with the pivot axis defined by the pivot pin 99 may be used to bias the stanchion toward its raised, upright position. Alternatively, one or more linear compression springs (not shown) may be used whereby the springs are compressed upon pivoting movement of the stanchion 93 toward its lowered position, thereby generating a biasing force on the stanchion to push the stanchion toward its upright position. It is also understood that any combination of linear tension springs, linear compression springs and/or torsion springs may be used to jointly bias the stanchion toward its upright position.

In view of the above, it will be seen that the several objects of the invention are achieved and other advantageous results attained. When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A receiving stand for a frame stacking system of the type used to stack prefabricated frames, said receiving stand comprising:
   a bench configured for receiving and supporting the frames thereon;
   a stanchion pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench; and
   a spring member biasing the stanchion toward its raised position, said spring member comprising at least one spring,
   wherein the stanchion has a lower end extending below the pivot axis of the stanchion in the upright position of the stanchion, the at least one spring applying a biasing force to the lower end of the stanchion to bias the stanchion toward its raised, upright position.

2. A receiving stand for a frame stacking system of the type used to stack prefabricated frames, said receiving stand comprising:
   a bench configured for receiving and supporting the frames thereon;
   a stanchion pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench;
   a spring member biasing the stanchion toward its raised position; and
   a shield panel generally adjacent the spring member for reducing the risk of injury in the event the spring member fails.

3. A receiving stand for a frame stacking system of the type used to stack prefabricated frames, said receiving stand comprising:

a bench configured for receiving and supporting the frames thereon;

a stanchion pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench; and a spring member biasing the stanchion toward its raised position, wherein the bench comprises a base, at least one support leg extending up from the base, and an elongate rail member supported by the at least one support leg and oriented for receiving and supporting the frames thereon, said stanchion has a generally U-shaped lower end comprising a cross-member extending generally transversely over the rail member of the bench and a pair of side members depending from the cross-member to below the rail member in the raised, upright position of the stanchion.

4. A receiving stand for a frame stacking system of the type used to stack prefabricated frames, said receiving stand comprising:

a bench configured for receiving and supporting the frames thereon;

a stanchion pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench, said pivot axis being located above the bench; and a spring member biasing the stanchion toward its raised position.

5. A receiving stand for a frame stacking system of the type used to stack prefabricated frames, said receiving stand comprising:

a bench configured for receiving and supporting the frames thereon, said bench having a height;

a stanchion pivotally movable relative to the bench about a pivot axis of the stanchion between a raised, generally upright position in which at least a portion of the stanchion extends above the bench to facilitate the stacking of frames on the bench, and a lowered position away from the frames stacked on the bench to facilitate unloading of the frames from the bench, wherein when the stanchion is in the raised, generally upright position, the portion of the stanchion extending above the bench has a length that is greater than the height of the bench; and a spring member biasing the stanchion toward its raised position.

6. A receiving stand as set forth in claim 1 wherein the at least one spring is a linear spring having one end connected to the lower end of the stanchion for conjoint movement therewith about the pivot axis of the stanchion, and an opposite end fixed against movement relative to the pivot axis of the stanchion.

7. A receiving stand as set forth in claim 6 wherein said receiving stand has a front end and a rear end, said portion of the stanchion extending above the pivot axis in the upright position of the stanchion pivoting substantially rearward and down relative to the bench upon movement of the stanchion toward its lowered position, said lower end of the stanchion below the pivot axis thereof pivoting substantially forward and up relative to the bench upon movement of the stanchion toward its lowered position, said opposite end of the at least one spring being fixed against movement relative to the pivot axis at a location substantially rearward of said pivot axis whereby pivoting movement of the stanchion toward its lowered position elongates said at least one spring such that said elongation of the spring generates a biasing force acting on the lower end of the stanchion to bias the stanchion toward its raised; upright position.

8. A receiving stand as set forth in claim 7 wherein the bench comprises a base, at least one support leg extending up from the base, and an elongate rail member supported by the at least one support leg and oriented for receiving and supporting the frames thereon, said receiving stand further comprising a carriage mounted on the rail member for longitudinal movement thereon, the stanchion being supported by the carriage for conjoint movement with the carriage on the rail member, said stanchion being pivotally connected to the carriage for rotation relative to the carriage and the bench between the lowered and the raised, upright positions of the stanchion.

9. A receiving stand as set forth in claim 8 wherein said opposite end of the at least one spring is connected to the carriage in fixed relation with the pivot axis of the stanchion.

10. A receiving stand as set forth in claim 8 wherein in the raised, upright position of the stanchion the lower end of the stanchion extends down below the rail member of the bench.

11. A receiving stand as set forth in claim 2 wherein the shield panel is connected to the stanchion for conjoint pivoting movement therewith, said shield panel being configured and arranged for positioning generally adjacent the spring member in the lowered position of the stanchion.

12. A receiving stand as set forth in claim 3 wherein the cross-member of the lower end of the stanchion is disposed generally below the pivot axis of the stanchion.

* * * * *